United States Patent
Baird et al.

(10) Patent No.: US 9,163,181 B2
(45) Date of Patent: Oct. 20, 2015

(54) METHODS AND APPARATUSES FOR DEOXYGENATING BIOMASS-DERIVED PYROLYSIS OIL

(75) Inventors: Lance Awender Baird, Prospect Heights, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 792 days.

(21) Appl. No.: 13/528,475

(22) Filed: Jun. 20, 2012

(65) Prior Publication Data

US 2013/0345487 A1     Dec. 26, 2013

(51) Int. Cl.
*C10G 3/00* (2006.01)
*C10G 45/02* (2006.01)
*C10G 69/06* (2006.01)

(52) U.S. Cl.
CPC .. *C10G 3/42* (2013.01); *C10G 3/40* (2013.01); *C10G 3/50* (2013.01); *C10G 3/52* (2013.01); *C10G 45/02* (2013.01); *C10G 69/06* (2013.01); *C10G 2300/1011* (2013.01)

(58) Field of Classification Search
CPC .............. C10G 3/42; C10G 3/40; C10G 3/50; C10G 3/52; C10G 45/02; C10G 56/06; C10G 2300/1011
USPC ........................................................ 585/240
See application file for complete search history.

(56) References Cited

U.S. PATENT DOCUMENTS

| | | | |
|---|---|---|---|
| 7,459,597 B2 | 12/2008 | Koivusalmi et al. | |
| 7,491,858 B2 | 2/2009 | Murzin et al. | |
| 2008/0308457 A1* | 12/2008 | Dindi et al. ................... | 208/135 |
| 2009/0253948 A1 | 10/2009 | McCall et al. | |
| 2011/0201854 A1 | 8/2011 | Kocal et al. | |
| 2011/0213188 A1 | 9/2011 | Agblevor et al. | |
| 2012/0005949 A1 | 1/2012 | Stevens et al. | |

FOREIGN PATENT DOCUMENTS

| | | |
|---|---|---|
| CN | 101144025 A | 3/2008 |
| WO | 2010117436 A1 | 10/2010 |
| WO | 2010117437 A1 | 10/2010 |
| WO | 2011053166 A1 | 5/2011 |
| WO | 2012018520 A2 | 2/2012 |
| WO | 2012018524 A2 | 2/2012 |
| WO | 2012035410 A2 | 3/2012 |

* cited by examiner

*Primary Examiner* — In Suk Bullock
*Assistant Examiner* — Philip Louie

(57) ABSTRACT

Embodiments of methods and apparatuses for deoxygenating a biomass-derived pyrolysis oil are provided. In one example, a method comprises the steps of separating a low-oxygen biomass-derived pyrolysis oil effluent into a low-oxygen-pyoil organic phase stream and an aqueous phase stream. Phenolic compounds are removed from the aqueous phase stream to form a phenolic-rich diluent recycle stream. A biomass-derived pyrolysis oil stream is diluted and heated with the phenolic-rich diluent recycle stream to form a heated diluted pyoil feed stream. The heated diluted pyoil feed stream is contacted with a deoxygenating catalyst in the presence of hydrogen to deoxygenate the heated diluted pyoil feed stream.

19 Claims, 1 Drawing Sheet

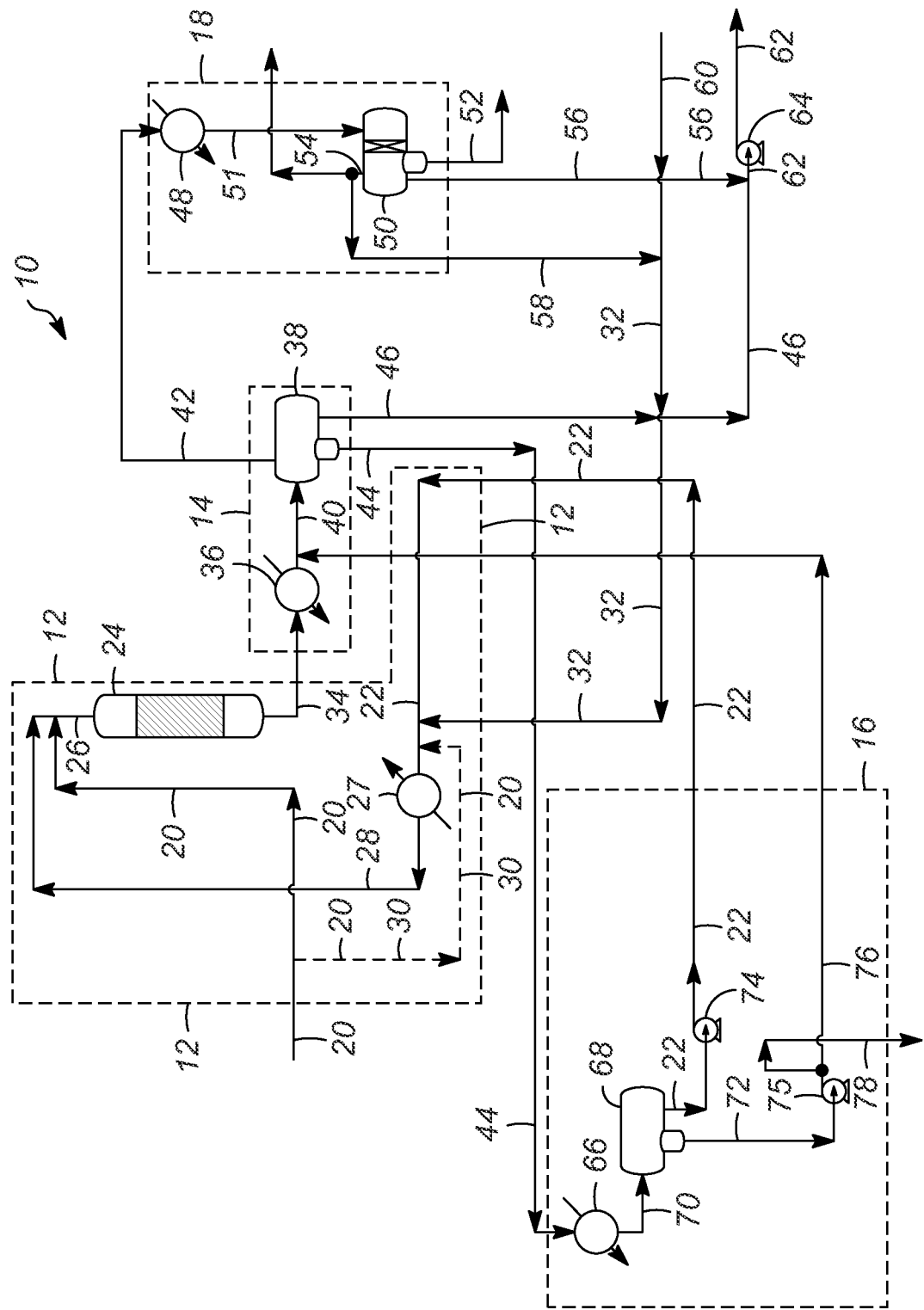

METHODS AND APPARATUSES FOR DEOXYGENATING BIOMASS-DERIVED PYROLYSIS OIL

STATEMENT REGARDING FEDERALLY SPONSORED RESEARCH OR DEVELOPMENT

This invention was made with Government support under DE-EE0002879 awarded by the U.S. Department of Energy. The Government has certain rights in this invention.

TECHNICAL FIELD

The technical field relates generally to methods and apparatuses for producing biofuels, and more particularly to methods and apparatuses for producing low-oxygen biomass-derived pyrolysis oil from the catalytic deoxygenation of biomass-derived pyrolysis oil.

BACKGROUND

Fast pyrolysis is a process during which organic carbonaceous biomass feedstock, i.e., "biomass", such as wood waste, agricultural waste, algae, etc., is rapidly heated to between about 300° C. to about 900° C. in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil (commonly referred to as "pyoil"). Biomass-derived pyrolysis oil can be burned directly as fuel for certain boiler and furnace applications, and can also serve as a potential feedstock in catalytic processes for the production of fuels in petroleum refineries. Biomass-derived pyrolysis oil has the potential to replace a substantial percentage of transportation fuels, thereby reducing the dependency on conventional petroleum and reducing its environmental impact.

However, biomass-derived pyrolysis oil is a complex, highly oxygenated organic liquid having properties that currently limit its utilization as a biofuel. For example, biomass-derived pyrolysis oil has high acidity and a low energy density attributable (compared to hydrocarbon oil) in large part to oxygenated hydrocarbons (the water content also contributes to low energy density) in the oil, which can undergo secondary reactions during storage particularly if the oil is stored at elevated temperatures. "Oxygenated hydrocarbons" or "oxygenates" as used herein are organic compounds containing hydrogen, carbon, and oxygen. Such oxygenated hydrocarbons in the biomass-derived pyrolysis oil include carboxylic acids, phenol, cresol, alcohols, aldehydes, and the like, such as ethers, esters, anhydrosugars, and furans. Conventional biomass-derived pyrolysis oil comprises about 30% or greater by weight oxygen from these oxygenated hydrocarbons. Conversion of biomass-derived pyrolysis oil into biofuels and chemicals requires full or partial deoxygenation of the biomass-derived pyrolysis oil. Such deoxygenation may proceed via two main routes, namely the elimination of either water, or CO and $CO_2$. Unfortunately, deoxygenating biomass-derived pyrolysis oil leads to rapid plugging or fouling of the processing catalyst in a hydroprocessing reactor caused by the formation of solids from the biomass-derived pyrolysis oil. Components in the pyrolysis oil form deposits on the processing catalysts causing catalytic bed fouling, reducing activity of the catalyst, and causing build up in the hydroprocessing reactor. It is believed that this plugging is due to an acid catalyzed thermal polymerization of the various components of the biomass-derived pyrolysis oil, e.g., reactions in which the various components of the oil polymerize with themselves, that create either a glassy brown polymer or powdery brown char that limits run duration and processibility of the biomass-derived pyrolysis oil.

Accordingly, it is desirable to provide methods and apparatuses for producing a low-oxygen biomass-derived pyrolysis oil without plugging of the catalyst, thereby increasing run duration and improving processibility of the biomass-derived pyrolysis oil. Furthermore, other desirable features and characteristics of the present invention will become apparent from the subsequent detailed description and the appended claims, taken in conjunction with the accompanying drawings and this background.

BRIEF SUMMARY

Methods and apparatuses for deoxygenating a biomass-derived pyrolysis oil are provided herein. In accordance with an exemplary embodiment, a method for deoxygenating a biomass-derived pyrolysis oil comprises the steps of separating a low-oxygen biomass-derived pyrolysis oil effluent into a low-oxygen-pyoil organic phase stream and an aqueous phase stream at first separation conditions in which phenolic compounds in the low-oxygen biomass-derived pyrolysis oil effluent are substantially miscible in the aqueous phase stream. The phenolic compounds are removed from the aqueous phase stream at second separation conditions in which the phenolic compounds are substantially immiscible in the aqueous phase stream to form a phenolic-rich diluent recycle stream. A biomass-derived pyrolysis oil stream is diluted and heated with the phenolic-rich diluent recycle stream to form a heated diluted pyoil feed stream. The heated diluted pyoil feed stream is contacted with a deoxygenating catalyst in the presence of hydrogen at hydroprocessing conditions effective to deoxygenate the heated diluted pyoil feed stream.

In accordance with another exemplary embodiment, a method for deoxygenating a biomass-derived pyrolysis oil is provided. The method comprises the steps of cooling and separating a low-oxygen biomass-derived pyrolysis oil effluent to form a low-oxygen-pyoil organic phase stream and a phenolic-containing aqueous phase stream. The phenolic-containing aqueous phase stream is cooled and separated to form a phenolic-rich diluent recycle stream and a water-rich stream. A biomass-derived pyrolysis oil stream is diluted and heated with the phenolic-rich diluent recycle stream to form a heated diluted pyoil feed stream. The heated diluted pyoil feed stream is introduced to a hydroprocessing reactor that contains a deoxygenating catalyst in the presence of hydrogen and that is operating at hydroprocessing conditions effective to deoxygenate the heated diluted pyoil feed stream.

An apparatus for deoxygenating a biomass-derived pyrolysis oil is provided. The apparatus comprises a first separation zone that is configured to receive a low-oxygen biomass-derived pyrolysis oil effluent. The first separation zone is further configured to separate the low-oxygen biomass-derived pyrolysis oil effluent into a low-oxygen-pyoil organic phase stream and an aqueous phase stream at first separation conditions in which phenolic compounds in the low-oxygen biomass-derived pyrolysis oil effluent are substantially miscible in the aqueous phase stream. A second separation zone is in fluid communication with the first separation zone. The second separation zone is configured to remove the phenolic compounds from the aqueous phase stream at second separation conditions in which the phenolic compounds are substantially immiscible in the aqueous phase stream to form a phenolic-rich diluent recycle stream. A reaction zone is in fluid communication with the second separation zone. The reaction zone comprises a hydroprocessing reactor that contains deoxygenating catalyst in the presence of hydrogen. The reaction zone is configured to dilute and heat a biomass-derived pyrolysis oil stream with the phenolic-rich diluent recycle stream to form a heated diluted pyoil feed stream for introduction to the hydroprocessing reactor operating at hydroprocessing conditions effective to deoxygenate the heated diluted pyoil feed stream.

BRIEF DESCRIPTION OF THE DRAWINGS

The various embodiments will hereinafter be described in conjunction with the following drawing FIGURES, wherein like numerals denote like elements, and wherein:

The FIGURE schematically illustrates an apparatus and a method for deoxygenating a biomass-derived pyrolysis oil in accordance with an exemplary embodiment.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to methods and apparatuses for deoxygenating a biomass-derived pyrolysis oil. Unlike the prior art, the exemplary embodiments taught herein produce a low-oxygen biomass-derived pyrolysis oil effluent by contacting a heated diluted pyoil feed stream with a deoxygenating catalyst in the presence of hydrogen at hydroprocessing conditions to deoxygenate the heated diluted pyoil feed stream. It should be appreciated that while the deoxygenated oil produced according to exemplary embodiments are generally described herein as a "low-oxygen biomass-derived pyrolysis oil," this term generally includes any pyoil produced having a lower oxygen concentration (i.e. a lower residual oxygen content) than conventional biomass-derived pyrolysis oil. The term "low-oxygen biomass-derived pyrolysis oil" is pyoil having some oxygen, i.e., a biomass-derived pyrolysis oil in which a portion of the oxygenated hydrocarbons have been converted into hydrocarbons (i.e. a "hydrocarbon product"). In an exemplary embodiment, the low-oxygen biomass-derived pyrolysis oil comprises an aqueous phase and a hydroprocessed organic phase (i.e. oil comprising primarily oxygenates and hydrocarbons) that comprises oxygen in an amount of from about 5 to about 25 weight percent (wt. %), for example about 10 to about 20 wt. %, of the hydroprocessed organic phase. "Hydrocarbons" as used herein are organic compounds that contain principally only hydrogen and carbon, i.e., oxygen-free. "Oxygenated hydrocarbons" as used herein are organic compounds containing hydrogen, carbon, and oxygen. Exemplary oxygenated hydrocarbons in biomass-derived pyrolysis oil include alcohols such as phenol and cresol, carboxylic acids, aldehydes, and the like, such as ethers, esters, anhydrosugars, and furans.

The heated diluted pyoil feed stream is formed by diluting and heating a biomass-derived pyrolysis oil stream with a phenolic-rich diluent recycle stream. The phenolic-rich diluent recycle stream is formed from a portion of the low-oxygen biomass-derived pyrolysis oil effluent that has been selectively separated to be rich in phenolic compounds that are mutually miscible with the biomass-derived pyrolysis oil. As used herein, the term "phenolic compounds" are a class of chemical compounds that include a hydroxyl group bonded directly to an aromatic hydrocarbon group. Examples of phenolic compounds include phenol, alkylphenol such as cresol and the like, and/or other phenol substituted compounds. In an exemplary embodiment, the phenolic-rich diluent recycle stream comprises phenolic compounds that are present in an amount of about 50 wt. % or greater, such as from about 50 to about 100 wt. %. The non-phenolic components in the phenolic-rich diluent stream include water and other organic oxygenates such as alcohols and carboxylic acids, which are co-soluble with the phenolic compounds. In an exemplary embodiment, the biomass-derived pyrolysis oil stream is diluted with the phenolic-rich diluent recycle stream such that the heated diluted pyoil feed stream contains from about 10 to about 25 wt. % of the biomass-derived pyrolysis oil stream and from about 75 to about 90 wt. % of the phenolic-rich diluent recycle stream.

It has been found that by contacting the deoxygenating catalyst with the heated diluted pyoil feed stream in the presence of hydrogen at the hydroprocessing conditions, the amount of glassy brown polymer or powdery brown char formed on the deoxygenating catalyst is substantially reduced or minimized relative to conventional methods. Without being limited by theory, it is believed that by diluting the biomass-derived pyrolysis oil stream with the phenolic-rich diluent recycle stream, simple reactions of the biomass-derived pyrolysis oil with hydrogen to form a lower-oxygen biomass-derived pyrolysis oil are effectively increased and dominate while secondary polymerization reactions of biomass-derived pyrolysis oil components with themselves are reduced or minimized, thereby reducing or minimizing the formation of glassy brown polymers or powdery brown char on the deoxygenating catalyst. Therefore, a low-oxygen biomass-derived pyrolysis oil can be produced in a reactor without plugging the deoxygenating catalyst, thereby increasing run duration and improving processibility of the biomass-derived pyrolysis oil.

Referring to the FIGURE, a schematic depiction of an apparatus 10 for deoxygenating a biomass-derived pyrolysis oil in accordance with an exemplary embodiment is provided. The apparatus 10 comprises a reaction zone 12, a separation zone 14, a separation zone 16, and a separation zone 18 that are in fluid communication with each other. As used herein, the term "zone" can refer to an area including one or more equipment items and/or one or more sub-zones. Equipment items can include one or more reactors or reactor vessels, heaters, coolers, exchangers, pipes, pumps, compressors, and controllers. Additionally, an equipment item, such as a reactor, dryer, or vessel, can further include one or more zones or sub-zones.

As illustrated, a biomass-derived pyrolysis oil stream 20 comprising the biomass-derived pyrolysis oil is introduced to the reaction zone 12. The biomass-derived pyrolysis oil may be produced, such as, for example, from pyrolysis of biomass in a pyrolysis reactor. Virtually any form of biomass can be used for pyrolysis to produce the biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like.

The composition of the biomass-derived pyrolysis oil can vary considerably and depends on the feedstock and processing variables. Examples of biomass-derived pyrolysis oil "asproduced" can contain, for example, from about 1,000 to about 116,000 ppm total metals, about 20 to about 33 weight percent (wt. %) of water that can have high acidity (e.g. total acid number (TAN)>150), and can have a solids content of from about 0.1 wt. % to about 5 wt. %. The biomass-derived pyrolysis oil may be untreated (e.g. "as produced"). However, if needed the biomass-derived pyrolysis oil can be selectively treated to reduce any or all of the above to a desired level. In an exemplary embodiment, the biomass-derived pyrolysis oil comprises an organic phase (i.e., oil comprising primarily oxygenates and/or hydrocarbons) that has a residual oxygen content of about 30 wt. % or greater, such as from about 30 to about 50 wt. %, for example from about 35 to about 45 wt. % of the organic phase.

The biomass-derived pyrolysis oil can be thermally unstable and may be stored and/or handled so as to reduce its exposure to higher temperatures, minimizing any secondary polymerization reactions of the various components in the biomass-derived pyrolysis oil with themselves prior to hydroprocessing. In an exemplary embodiment, the biomass-derived pyrolysis oil stream 20 has as an initial temperature (e.g., storage temperature) of about 80° C. or less, such as from about 15 to about 80° C., such as from about 15 to about 50° C., for example about ambient, to minimize secondary polymerization reactions.

As will be discussed in further detail below, a phenolic-rich diluent recycle stream 22, which is formed in the separation zone 16, is passed along to the reaction zone 12. The phenolic-rich diluent recycle stream 22 is a partially deoxygenated pyoil stream that has been selectively separated to be rich in phenolic compounds and is being recycled. As such, the phenolic-rich diluent recycle stream 22 has less pyoil reactant components that can form solids by secondary polymerization reactions and is mutually miscible with the biomass-derived pyrolysis oil stream 20. In an exemplary embodiment, the phenolic-rich diluent recycle stream 22 comprises phenolic compounds that are present in an amount of about 50 wt. % or greater, such as about 75 wt. % or greater, for example from about 90 to about 100 wt. % of the phenolic-rich diluent recycle stream 22. In another exemplary embodiment, the phenolic compounds comprise phenol, cresol, other alkylphenols, and/or other phenol substituted compounds, such as, for example, various isomers of methylphenol, tert-butylphenol, trimethylphenol, dimethylphenol, dimethoxyphenol, cyclopentylphenol, ethylphenol, ethyl-methylphenol, methoxyphenol, methoxy-propylphenol, methyl-isopropylphenol, propylphenol, methyl-propylphenol, ethyl-methoxyphenol, methoxy-propenylphenol, and/or dimethoxy-propenylphenol.

The reaction zone 12 comprises a hydroprocessing reactor 24. Upstream from the hydroprocessing reactor 24, the biomass-derived pyrolysis oil stream 20 is diluted and heated with the phenolic-rich diluent recycle stream 22 to form a heated diluted pyoil feed stream 26. In one embodiment, the biomass-derived pyrolysis oil stream 20 is diluted and heated with the phenolic-rich diluent recycle stream 22 by passing the phenolic-rich diluent recycle stream 22 through a heater 27 to form a heated phenolic-rich diluent recycle stream 28 that is combined with the biomass-derived pyrolysis oil stream 20 proximate an inlet of the hydroprocessing reactor 24. In one example, the heater 27 heats the phenolic-rich diluent recycle stream 22 to a temperature of from about 285 to about 425° C. and the heated phenolic-rich diluent recycle stream 28 is combined with the biomass-derived pyrolysis oil stream 20 to form the heated diluted pyoil feed stream 26 having a temperature of from about 260 to about 375° C. In another embodiment, the biomass-derived pyrolysis oil stream 20 is diluted and heated with the phenolic-rich diluent recycle stream 22 by combining the biomass-derived pyrolysis oil stream 20 (advanced along dashed line 30) with the phenolic-rich diluent recycle stream 22 upstream from the heater 27 to form a combined stream that is passed through the heater 27 to form the heated diluted pyoil feed stream 26. In one example, the combined stream is heated to a temperature of from about 260 to about 375° C. to form the heated diluted pyoil feed stream 26.

In an exemplary embodiment, the biomass-derived pyrolysis oil stream 20 and the phenolic-rich diluent recycle stream 22 (e.g., the heated phenolic-rich diluent recycle stream 28 if previously heated by heater 27) are combined at a predetermined recycle ratio of from about 3:1 to about 10:1 to form the heated diluted pyoil feed stream 26. The predetermined recycle ratio is defined by a mass flow rate of the phenolic-rich diluent recycle stream 22 to a mass flow rate of the biomass-derived pyrolysis oil stream 20.

As illustrated, a hydrogen-containing gas stream 32 is combined with the phenolic-rich diluent recycle stream 22 upstream from the heater 27 so that the heated diluted pyoil feed stream 26 is formed and introduced to the hydroprocessing reactor 24 together with the hydrogen-containing gas stream 32. Alternatively, the biomass-derived pyrolysis oil stream 20 may be diluted and heated without the hydrogen-containing gas stream 32, and the hydrogen-containing gas stream 32 can be introduced to the hydroprocessing reactor 24 separately from the heated diluted pyoil feed stream 26.

The heated diluted pyoil feed stream 26 is directed into the hydroprocessing reactor 24. The hydroprocessing reactor 24 can be a continuous flow reactor, such as a fixed-bed reactor, a continuous stirred tank reactor (CSTR), a trickle bed reactor, an ebullating bed reactor, a slurry reactor, or any other reactor known to those skilled in the art for hydroprocessing.

The hydroprocessing reactor 24 contains a deoxygenating catalyst in the presence of hydrogen. In an exemplary embodiment, the deoxygenating catalyst comprises a metal or a combination of metals, such as a base metal(s), a refractory metal(s), and/or a noble metal(s), such as platinum, palladium, ruthenium, nickel, molybdenum, tungsten, and/or cobalt. The metal(s) may be on a support, such as a carbon support, a silica support, an alumina support, a silica-alumina support, a gamma alumina support, and/or a titanium support. Other hydroprocessing catalysts known to those skilled in the art may also be used.

The hydroprocessing reactor 24 is operating at hydroprocessing conditions. In an exemplary embodiment, the hydroprocessing conditions include a reactor temperature of from about 260 to about 375° C., for example from about 270 to about 320° C. (e.g., 280° C.), a reactor pressure of from about 2 to about 20 MPa gauge, a liquid hourly space velocity on a basis of volume of the biomass-derived pyrolysis oil/volume of catalyst/hour ($hr^{-1}$) of from about 0.5 to about 1 $hr^{-1}$, and a hydrogen-containing gas treat rate of from about 1,000 to about 15,000 standard cubic feet per barrel (SCF/B).

In an exemplary embodiment, the heated diluted pyoil feed stream 26 is formed just upstream of the hydroprocessing reactor 24 and the temperature of the heated diluted pyoil feed stream 26 is at about the reactor temperature to facilitate rapid catalytic deoxygenation of the heated diluted pyoil feed stream 26 with a short or minimal residence time. The term "residence time" as used herein is the amount of time from when the biomass-derived pyrolysis oil stream 20 is diluted and heated with the phenolic-rich diluent recycle stream 22 to when the heated diluted pyoil feed stream 26 initially contacts the deoxygenating catalyst. By having a relatively short residence time, less solids can form in the heated diluted pyoil feed stream 26 at elevated temperatures by secondary polymerization reactions before hydroprocessing begins. In an exemplary embodiment, the residence time is about 60 seconds or less, such as about 20 seconds or less, such as about 10 second or less, for example from about 10 to about 1 seconds.

The heated diluted pyoil feed stream 26 contacts the deoxygenating catalyst at the hydroprocessing conditions in the presence of hydrogen and forms a low-oxygen biomass-derived pyrolysis oil effluent 34 by converting a portion of the oxygenated hydrocarbons in the biomass-derived pyrolysis oil into hydrocarbons. In particular, hydrogen from the hydrogen-containing gas stream 32 removes oxygen from the biomass-derived pyrolysis oil as water to produce the low-oxygen biomass-derived pyrolysis oil effluent 34 that comprises an aqueous phase and a hydroprocessed organic phase. The hydroprocessed organic phase comprises oil that is deoxygenated with some residual oxygenated hydrocarbons, such as, for example, various phenolic compounds, alcohols, aldehydes, and the like. In an exemplary embodiment, the hydroprocessed organic phase of the low-oxygen biomass-derived pyrolysis oil effluent 34 has a residual oxygen content of from about 10 to about 20 wt. %, for example from about 10 to about 15 wt. % of the hydroprocessed organic phase.

It is believed that the benefits of catalytically deoxygenating the biomass-derived pyrolysis oil stream 20 that is diluted and heated with the phenolic-rich diluent recycle stream 22 may result in increasing hydrogen solubility, immolating the exotherm by dilution of the reactive species in the biomass-derived pyrolysis oil, and reducing the reaction rate of bimolecular reactants that lead to secondary polymerization reactions. As such, simple reactions of the biomass-derived pyrolysis oil with hydrogen to form a lower-oxygen biomass-derived pyrolysis oil dominate while secondary polymerization reactions of biomass-derived pyrolysis oil components with themselves are reduced or minimized, thereby reducing or minimizing the formation of glassy brown polymers or powdery brown char on the deoxygenating catalyst.

In an exemplary embodiment, the low-oxygen biomass-derived pyrolysis oil effluent 34 is removed from the hydroprocessing reactor 24 and is introduced to the separation zone 14. As illustrated, the separation zone 14 comprises a cooler 36, e.g., chiller, exchanger, or the like, and a separator 38, e.g., three-phase separator or the like, that is in fluid communication with the cooler 36. The low-oxygen biomass-derived pyrolysis oil effluent 34 is passed through the cooler 36 and cooled to form a partially cooled low-oxygen biomass-derived pyrolysis oil effluent 40 that is introduced to the separator 38 at first separation conditions. In one embodiment, the partially cooled low-oxygen biomass-derived pyrolysis oil effluent 40 is at a temperature in which the phenolic compounds in the hydroprocessed organic phase are substantially miscible in the aqueous phase. As used herein, the term "the phenolic compounds are substantially miscible in the aqueous phase" means that the phenolic compounds are capable of being dissolved in the aqueous phase to about 50 wt. % or greater of the aqueous phase at a particular temperature. It has been found that the phenolic compounds, such as phenol, cresol, other alkyl phenol, and other phenol substituted compounds typically form a two-phase mixture with water except at certain temperatures in which the phenolic compounds become miscible with water and form a single phase. As such, a substantial portion of the phenolic compounds in the hydroprocessed organic phase are effectively extracted from the hydroprocessed organic phase into the aqueous phase of the partially cooled low-oxygen biomass-derived pyrolysis oil effluent 40. In an exemplary embodiment, the first separation conditions include a temperature of from about 60 to about 150° C.

In an exemplary embodiment, the separator 38 separates the partially cooled low-oxygen biomass-derived pyrolysis oil effluent 40 at the first separation conditions into a water-$H_2$ gas containing stream 42, an aqueous phase stream 44, and a low-oxygen-pyoil organic phase stream 46. The water-$H_2$ gas containing stream 42 comprises water vapors, unreacted hydrogen, and other residual components, the aqueous phase stream 44 comprises the aqueous phase including a portion of the phenolic compounds miscible in the aqueous phase, and the low-oxygen-pyoil organic phase stream 46 comprises the hydroprocessed organic phase less the portion of the phenolic compounds miscible in the aqueous phase.

The water-$H_2$ gas containing stream 42 is passed along to the separation zone 18 where it is passed through a condenser 48 and introduced to a separator 50, e.g., three-phase separator or the like. In an exemplary embodiment, the condenser 48 cools the water-$H_2$ gas containing stream 42 to form a cooled water-$H_2$ gas containing stream 51 having a temperature of from about 10 to about 50° C., for example from about 20 to about 30° C. The separator 50 separates the cooled water-$H_2$ gas containing stream 51 into an aqueous stream 52, a hydrogen-containing gas stream 54, and a residual low-oxygen-pyoil stream 56. The aqueous stream 52 is removed from the apparatus 10 for treatment, disposal, or the like, or alternatively, may be recycled with the aqueous phase stream 44 that is sent to the separation zone 16 and the water balance maintained using stream 78. As illustrated, a portion of the hydrogen-containing gas stream 54 is used to form a hydrogen-containing recycle gas stream 58 that is combined with a fresh hydrogen feed 60 to form the hydrogen-containing gas stream 32. The remaining portion of the hydrogen-containing gas stream 54 may be removed from the apparatus 10 for use as a fuel product or otherwise. The residual low-oxygen-pyoil stream 56 may be combined with the low-oxygen-pyoil organic phase stream 46 from the separation zone 14 to form a combined low-oxygen-pyoil stream 62 that is passed through a pump 64 and removed from the apparatus 10 for use as a fuel product, or alternatively, may be passed along for additional hydroprocessing to further lower its oxygen content.

In an exemplary embodiment, the aqueous phase stream 44 is removed from the separation zone 14 and is passed along to the separation zone 16. The separation zone 16 comprises a cooler 66, e.g., chiller, exchanger, or the like, and a separator 68, e.g., two-phase separator or the like, that is in fluid communication with the cooler 66. The aqueous phase stream 44 is passed through the cooler 66 and cooled to form a cooled aqueous phase stream 70 that is introduced to the separator 68 at second separation conditions. In particular, the cooled aqueous phase stream 70 is at a temperature in which the phenolic compounds are substantially immiscible in the aqueous phase. As used herein, the term "the phenolic compounds are substantially immiscible in the aqueous phase" means that the phenolic compounds are not capable of being dissolved in the aqueous phase to about 50 wt. % or greater of the aqueous phase at a particular temperature. As such, a substantial portion of the phenolic compounds in the cooled aqueous phase stream 70 separate from the aqueous phase, forming two distinct phases, a phenolic-rich phase and a water-rich phase. In an exemplary embodiment, the second separation conditions include a temperature of from about 10 to about 50° C.

In an exemplary embodiment, the separator 68 separates the cooled aqueous phase stream 70 at the second separation conditions into the phenolic-rich diluent recycle stream 22 and a water-rich stream 72. The phenolic-rich diluent recycle stream 22 is passed through a pump 74 and is directed toward the reaction zone 12 as discussed above. In an exemplary embodiment, the water-rich stream 72 is passed through a pump 75 and a portion 76 of the water-rich stream 72 is recycled and combined with the partially cooled low-oxygen biomass-derived pyrolysis oil effluent 40 to increase the water content in the effluent 40, which effectively increases the amount of the phenolic compounds that can be extracted from the hydroprocessed organic phase into the aqueous phase. The remaining portion 78 of the water-rich stream may be removed from the apparatus 10 for treatment, disposal, or otherwise to help maintain the water balance in the process.

Accordingly, methods and apparatuses for deoxygenating a biomass-derived pyrolysis oil have been described. The exemplary embodiments taught herein produce a low-oxygen biomass-derived pyrolysis oil effluent by contacting a heated diluted pyoil feed stream with a deoxygenating catalyst in the presence of hydrogen at hydroprocessing conditions to deoxygenate the heated diluted pyoil feed stream. The heated diluted pyoil feed stream is formed by diluting and heating a biomass-derived pyrolysis oil stream with a phenolic-rich diluent recycle stream. The phenolic-rich diluent recycle stream is formed from a portion of the low-oxygen biomass-derived pyrolysis oil effluent that has been selectively separated to be rich in phenolic compounds that are mutually miscible with the biomass-derived pyrolysis oil. It has been found that by contacting the deoxygenating catalyst with the heated diluted pyoil feed stream in the presence of hydrogen at the hydroprocessing conditions, the amount of glassy brown polymer or powdery brown char formed on the deoxygenating catalyst is substantially reduced or minimized relative to conventional methods. Therefore, a low-oxygen biomass-derived pyrolysis oil can be produced in a reactor without plugging the deoxygenating catalyst, thereby increasing run duration and improving processability of the biomass-derived pyrolysis oil.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for deoxygenating a biomass-derived pyrolysis oil, the method comprising the steps of:
   separating a low-oxygen biomass-derived pyrolysis oil effluent comprising phenolic compounds into a low-oxygen-pyoil organic phase stream and an aqueous phase stream at first separation conditions in which phenolic compounds in the low-oxygen biomass-derived pyrolysis oil effluent are miscible in the aqueous phase stream;
   removing the phenolic compounds from the aqueous phase stream at second separation conditions in which the phenolic compounds are immiscible in the aqueous phase stream to form a phenolic-rich diluent recycle stream;
   diluting and heating a biomass-derived pyrolysis oil stream with the phenolic-rich diluent recycle stream to form a heated diluted pyoil feed stream; and
   contacting the heated diluted pyoil feed stream with a deoxygenating catalyst in the presence of hydrogen at hydroprocessing conditions effective to deoxygenate the heated diluted pyoil feed stream to produce the low-oxygen biomass-derived pyrolysis oil effluent.

2. The method of claim 1, wherein the first separation conditions include a temperature of from about 60 to about 150° C.

3. The method of claim 1, wherein the second separation conditions include a temperature of from about 10 to about 50° C.

4. The method of claim 1, wherein the step of diluting and heating comprises diluting the biomass-derived pyrolysis oil stream with the phenolic-rich diluent recycle stream at a recycle ratio of from about 3:1 to about 10:1, wherein the recycle ratio is defined by a recycle mass flow rate of the phenolic-rich diluent recycle stream to a pyoil mass flow rate of the biomass-derived pyrolysis oil stream.

5. The method of claim 1, wherein the step of diluting and heating comprises:
   heating the phenolic-rich diluent recycle stream to form a heated phenolic-rich diluent recycle stream; and
   combining the biomass-derived pyrolysis oil stream with the heated phenolic-rich diluent recycle stream to form the heated diluted pyoil feed stream.

6. The method of claim 1, wherein the step of diluting and heating comprises:
   combining the biomass-derived pyrolysis oil stream with the phenolic-rich diluent recycle stream to form a combined stream; and
   heating the combined stream to form the heated diluted pyoil feed stream.

7. The method of claim 1, wherein the hydroprocessing conditions include a reaction temperature of from about 260 to about 375° C.

8. The method of claim 1, wherein the hydroprocessing conditions include a reactor pressure of from about 2 to about 20 MPa gauge.

9. The method of claim 1, wherein the phenolic compounds comprise phenol, alkylphenols, phenol substituted compounds, or combinations thereof.

10. The method of claim 1, wherein the low-oxygen biomass-derived pyrolysis oil effluent has a hydroprocessed organic phase comprising a residual oxygen content of from about 10 to about 20 wt. % of the hydroprocessed organic phase.

11. A method for deoxygenating a biomass-derived pyrolysis oil, the method comprising the steps of:
    cooling and separating a low-oxygen biomass-derived pyrolysis oil effluent comprising phenolic compounds to form a low-oxygen-pyoil organic phase stream and a phenolic-containing aqueous phase stream;
    cooling and separating the phenolic-containing aqueous phase stream to form a phenolic-rich diluent recycle stream and a water-rich stream;
    diluting and heating a biomass-derived pyrolysis oil stream with the phenolic-rich diluent recycle stream to form a heated diluted pyoil feed stream; and
    contacting the heated diluted pyoil feed stream with a deoxygenating catalyst in the presence of hydrogen in a hydroprocessing reactor at hydroprocessing conditions effective to deoxygenate the heated diluted pyoil feed stream to produce the low-oxygen biomass-derived pyrolysis oil effluent.

12. The method of claim 11, wherein the step of cooling and separating the low-oxygen biomass-derived pyrolysis oil effluent comprises:

cooling the low-oxygen biomass-derived pyrolysis oil effluent with a first cooler to form a partially-cooled low-oxygen biomass-derived pyrolysis oil effluent; and introducing the partially-cooled low-oxygen biomass-derived pyrolysis oil effluent to a first separator to form the low-oxygen-pyoil organic phase stream and the phenolic-containing aqueous phase stream.

13. The method of claim 12, wherein the partially-cooled low-oxygen biomass-derived pyrolysis oil effluent has a temperature of from about 60 to about 150° C.

14. The method of claim 12, further comprising a step of adding at least a portion of the water-rich stream to the low-oxygen biomass-derived pyrolysis oil effluent or the partially-cooled low-oxygen biomass-derived pyrolysis oil effluent prior to the step of contacting.

15. The method of claim 11, wherein the step of cooling and separating the phenolic-containing aqueous phase stream comprises:

cooling the phenolic-containing aqueous phase stream with a second cooler to form a partially-cooled phenolic-containing aqueous phase stream; and introducing the partially-cooled phenolic-containing aqueous phase stream to a second separator to form the phenolic-rich diluent recycle stream and the water-rich stream.

16. The method of claim 15, wherein the partially-cooled phenolic-containing aqueous phase stream has a temperature of from about 10 to about 50° C.

17. The method of claim 11, wherein the step of diluting and heating comprises:

heating the phenolic-rich diluent recycle stream to form a heated phenolic-rich diluent recycle stream having a first temperature of from about 285 to about 425° C.; and combining the biomass-derived pyrolysis oil stream with the heated phenolic-rich diluent recycle stream to form the heated diluted pyoil feed stream having a second temperature of from about 260 to about 375° C.

18. The method of claim 11, wherein the step of diluting and heating comprises:

combining the biomass-derived pyrolysis oil stream with the phenolic-rich diluent recycle stream to form a combined stream; and heating the combined stream to form the heated diluted pyoil feed stream, wherein the heated diluted pyoil feed stream has a temperature of from about 260 to about 375° C.

19. The method of claim 11, wherein the step of cooling and separating the low-oxygen biomass-derived pyrolysis oil effluent further comprises forming a $H_2$-rich gas stream, and wherein the method further comprises a step of:

combining at least a portion of the $H_2$-rich gas stream with the phenolic-rich diluent recycle stream prior to the step of diluting and heating.

* * * * *